(12) United States Patent
Qiu

(10) Patent No.: US 10,805,088 B2
(45) Date of Patent: Oct. 13, 2020

(54) CROSS-BLOCKCHAIN AUTHENTICATION METHOD, APPARATUS, AND ELECTRONIC DEVICE

(71) Applicant: Alibaba Group Holding Limited, George Town (KY)

(72) Inventor: Honglin Qiu, Zhejiang (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/374,195

(22) Filed: Apr. 3, 2019

(65) Prior Publication Data

US 2019/0305966 A1    Oct. 3, 2019

(30) Foreign Application Priority Data

Apr. 3, 2018    (CN) .......................... 2018 1 0291308

(51) Int. Cl.
*H04L 9/32* (2006.01)
*H04L 9/30* (2006.01)

(52) U.S. Cl.
CPC .............. *H04L 9/3247* (2013.01); *H04L 9/30* (2013.01); *H04L 9/3239* (2013.01); *H04L 2209/38* (2013.01)

(58) Field of Classification Search
CPC ...... H04L 9/3247; H04L 9/30; H04L 2209/38
See application file for complete search history.

(56) References Cited

U.S. PATENT DOCUMENTS 10,102,265 B1 *  10/2018  Madisetti ........... G06Q 20/0658
10,212,145 B2    2/2019   Chavez et al.
(Continued)

FOREIGN PATENT DOCUMENTS

CN    105187212    12/2015
CN    106789041     5/2017
(Continued)

OTHER PUBLICATIONS

"Steve Ellis, Ari Jules, Sergey Nazarov", "ChainLink A Decentralized Oracle Network", "Sep. 4, 2017", (v1.0) (Year: 2017).*
(Continued)

*Primary Examiner* — John B King
*Assistant Examiner* — Darshan I Dhruv
(74) *Attorney, Agent, or Firm* — Fish & Richardson P.C.

(57) ABSTRACT

Implementations of the present specification provide for cross-blockchain authentication. A public key of a database engine comprising a trusted node of a second blockchain is determined by a subscribing client included in a system for cross-chain interaction. The public key is used as an authentication data source. The system comprises the subscribing client (corresponding to a first blockchain), a publishing client (corresponding to the second blockchain), and a cross-chain interaction end separately connected to the subscribing client and publishing client. Data that is to be authenticated in the second blockchain is determined using the cross-chain interaction end. The data is published by the publishing client. The data to be authenticated is signed by the database engine using a private key of the database engine. The data authentication performed on the data uses the authentication data source and a signature of the data to be authenticated.

17 Claims, 8 Drawing Sheets

(56) References Cited

U.S. PATENT DOCUMENTS

| | | | |
|---|---|---|---|
| 2012/0296829 A1* | 11/2012 | Camenisch | G06Q 30/0603 705/67 |
| 2016/0162897 A1* | 6/2016 | Feeney | G06Q 20/065 705/71 |
| 2017/0046651 A1* | 2/2017 | Lin | H04L 9/0861 |
| 2017/0178127 A1* | 6/2017 | Kravitz | G06Q 20/401 |
| 2017/0287068 A1* | 10/2017 | Nugent | G06Q 20/08 |
| 2017/0352027 A1* | 12/2017 | Zhang | G06Q 20/3678 |
| 2017/0366348 A1* | 12/2017 | Weimer | H04L 9/3247 |
| 2018/0025435 A1* | 1/2018 | Karame | G06Q 20/02 705/30 |
| 2018/0091316 A1* | 3/2018 | Stradling | G06Q 40/04 |
| 2018/0144156 A1* | 5/2018 | Marin | G06F 21/6272 |
| 2018/0174122 A1* | 6/2018 | Mattingly | G06Q 20/223 |
| 2018/0191503 A1* | 7/2018 | Alwar | H04L 9/14 |
| 2018/0204260 A1* | 7/2018 | McGregor | G06Q 30/0609 |
| 2018/0227131 A1* | 8/2018 | Ebrahimi | G06Q 20/065 |
| 2018/0234241 A1 | 8/2018 | Weimer et al. | |
| 2019/0036680 A1 | 1/2019 | Sundaresan | |
| 2019/0036681 A1 | 1/2019 | Sundaresan | |
| 2019/0036932 A1* | 1/2019 | Bathen | H04L 9/3231 |
| 2019/0066228 A1* | 2/2019 | Wright | G06F 16/1834 |
| 2019/0081790 A1* | 3/2019 | Mandal | H04L 63/0428 |
| 2019/0122186 A1* | 4/2019 | Kano | G06Q 20/065 |
| 2019/0141026 A1* | 5/2019 | Kshirsagar | H04L 63/126 |
| 2019/0165943 A1* | 5/2019 | Chari | H04L 9/3218 |
| 2019/0165948 A1* | 5/2019 | Sako | G09C 1/00 |
| 2019/0172456 A1* | 6/2019 | Lee | G10L 15/1815 |
| 2019/0173854 A1* | 6/2019 | Beck | H04L 9/3247 |
| 2019/0266178 A1* | 8/2019 | Madhavan | G06F 16/2365 |

FOREIGN PATENT DOCUMENTS

| | | |
|---|---|---|
| CN | 106789881 | 5/2017 |
| CN | 106899698 | 6/2017 |
| CN | 106960388 | 7/2017 |
| CN | 107040384 | 8/2017 |
| CN | 107085810 | 8/2017 |
| CN | 107169865 | 9/2017 |
| CN | 107248076 | 10/2017 |
| CN | 107346482 | 11/2017 |
| CN | 107464106 | 12/2017 |
| TW | 201732706 | 9/2017 |

OTHER PUBLICATIONS

Steve Ellis, Ari Juels, Sergey Nazarov, "ChainLink A Decentralized Oracle Network", Sep. 4, 2017 (Year: 2017).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Buterin, "Chain Interoperability," R3 Research Paper, Sep. 2016, 25 pages.
Ellis et al., "A decentralized Oracle Network," ChainLink, Sep. 2017, 38 pages.
PCT International Search Report and Written Opinion in International Application No. PCT/US2019/024522, dated Jun. 17, 2019, 11 pages.
steemit.com [online], "Eurochain Technical White Paper/ Oraclechain Technical White Paper", Jun. 2017, retrieved on Feb. 24, 2020, retrieved from URL <https://steemit.com/oraclechain/ @oraclechain/oraclechain-technical-white-paper>, 32 pages (with English Translation).

* cited by examiner

US 10,805,088 B2

CROSS-BLOCKCHAIN AUTHENTICATION METHOD, APPARATUS, AND ELECTRONIC DEVICE

CROSS-REFERENCE TO RELATED APPLICATIONS

This application claims priority to Chinese Patent Application No. 201810291308.4, filed on Apr. 3, 2018, which is hereby incorporated by reference in its entirety.

TECHNICAL FIELD

One or more implementations of the present specification relate to the field of the blockchain technology, and in particular, to a cross-blockchain authentication method, apparatus, and electronic device.

BACKGROUND

Blockchain technology, also referred to as a distributed ledger technology, is a new technology where several computing devices jointly participate in "accounting" to jointly maintain a complete distributed database. The blockchain technology is characterized by decentralization and openness, where each computing device can participate in recording data in the database, and data can be quickly synchronized between computing devices. Therefore, the following has been widely applied to many fields: A decentralized system is established by using the blockchain technology, and various execution programs are included in the blockchain-based distributed database for automatic execution.

SUMMARY

The present specification provides a cross-blockchain authentication method, applied to a system for cross-chain interaction that includes a subscribing client, a publishing client, and a cross-chain interaction end, where the subscribing client corresponds to a first blockchain, the publishing client corresponds to a second blockchain, the cross-chain interaction end is separately connected to the subscribing client and the publishing client, and the method includes: obtaining, by the subscribing client, a public key of an oracle engine connected to the second blockchain, and using the public key as an authentication data source; obtaining, by using the cross-chain interaction end, data that is to be authenticated in the second blockchain and is published by the publishing client, where the data to be authenticated is signed by the oracle engine based on a private key held by the oracle engine; and performing, based on the authentication data source and a signature of the data to be authenticated, data authentication on the data to be authenticated.

Optionally, the obtaining a public key of an oracle engine connected to the second blockchain, and using the public key as an authentication data source includes: obtaining the public key that is configured by a user and is of the oracle engine corresponding to the second blockchain, and using the public key as the authentication data source; or obtaining, by using the cross-chain interaction end, the public key that is published by the publishing client and is of the oracle engine corresponding to the second blockchain, and using the public key as the authentication data source.

Optionally, the obtaining, by using the cross-chain interaction end, data that is to be authenticated in the second blockchain and is published by the publishing client includes: initiating a subscription request to the cross-chain interaction end, where the subscription request is used to indicate subscription conditions to the cross-chain interaction end, so that the cross-chain interaction end requests, from the publishing client based on the subscription conditions, data that is to be authenticated in the second blockchain and satisfies the subscription conditions; and obtaining data that is to be authenticated and is published by the publishing client, where the data to be authenticated satisfies the subscription conditions, and is signed by the oracle engine based on the private key held by the oracle engine.

Optionally, the performing, based on the authentication data source and a signature of the data to be authenticated, data authentication on the data to be authenticated includes: verifying, based on the stored public key of the oracle engine in the authentication data source, the signature of the data to be authenticated; and if the verification on the signature succeeds, determining that the data authentication on the data to be authenticated succeeds.

Optionally, the publishing client is connected to the oracle engine, and the oracle engine is configured to perform data authentication on data in the second blockchain; after the data authentication succeeds, sign, based on the private key held by the oracle engine, data that is successfully authenticated; and actively push the signed data to the publishing client; or push the signed data to the publishing client in response to a data acquisition request of the publishing client.

Optionally, the oracle engine corresponding to the second blockchain is the publishing client.

Optionally, the subscribing client corresponds to a node device in the first blockchain, and the publishing client and the oracle engine correspond to a node device in the second blockchain.

The present specification further provides a cross-blockchain authentication apparatus, applied to a system for cross-chain interaction that includes a subscribing client, a publishing client, and a cross-chain interaction end, where the subscribing client corresponds to a first blockchain, the publishing client corresponds to a second blockchain, the cross-chain interaction end is separately connected to the subscribing client and the publishing client, and the apparatus includes: a first acquisition module, configured to obtain a public key of an oracle engine connected to the second blockchain, and use the public key as an authentication data source; a second acquisition module, configured to obtain, by using the cross-chain interaction end, data that is to be authenticated in the second blockchain and is published by the publishing client, where the data to be authenticated is signed by the oracle engine based on a private key held by the oracle engine; and an authentication module, configured to perform, based on the authentication data source and a signature of the data to be authenticated, data authentication on the data to be authenticated.

Optionally, the first acquisition module is configured to obtain the public key that is configured by a user and is of the oracle engine corresponding to the second blockchain, and use the public key as the authentication data source; or obtain, by using the cross-chain interaction end, the public key that is published by the publishing client and is of the oracle engine corresponding to the second blockchain, and use the public key as the authentication data source.

Optionally, the second acquisition module is configured to initiate a subscription request to the cross-chain interaction end, where the subscription request is used to indicate subscription conditions to the cross-chain interaction end, so that the cross-chain interaction end requests, from the publishing client based on the subscription conditions, data that is to be authenticated in the second blockchain and satisfies the subscription conditions; and obtain data that is to be authenticated and is published by the publishing client, where the data to be authenticated satisfies the subscription conditions, and is signed by the oracle engine based on the private key held by the oracle engine.

Optionally, the authentication module is configured to verify, based on the stored public key of the oracle engine in the authentication data source, the signature of the data to be authenticated; and if the verification on the signature succeeds, determine that the data authentication on the data to be authenticated succeeds.

Optionally, the publishing client is connected to the oracle engine, and the oracle engine is configured to perform data authentication on data in the second blockchain; after the data authentication succeeds, sign, based on the private key held by the oracle engine, data that is successfully authenticated; and actively push the signed data to the publishing client; or push the signed data to the publishing client in response to a data acquisition request of the publishing client.

Optionally, the oracle engine corresponding to the second blockchain is the publishing client.

Optionally, the subscribing client corresponds to a node device in the first blockchain, and the publishing client and the oracle engine correspond to a node device in the second blockchain.

The present specification further provides an electronic device, including: a processor; and a memory, configured to store a machine executable instruction, where after the machine executable instruction that is stored in the memory and corresponds to control logic of cross-blockchain authentication is read and executed, the processor is configured to obtain a public key of an oracle engine connected to a second blockchain, and use the public key as an authentication data source; obtain, by using a cross-chain interaction end, data that is to be authenticated in the second blockchain and is published by a publishing client, where the cross-chain interaction end is in a system for cross-chain interaction that includes a subscribing client, the publishing client, and the cross-chain interaction end, the subscribing client corresponds to a first blockchain, the publishing client corresponds to the second blockchain, the cross-chain interaction end is separately connected to the subscribing client and the publishing client, and the data to be authenticated is signed by the oracle engine based on a private key held by the oracle engine; and perform, based on the authentication data source and a signature of the data to be authenticated, data authentication on the data to be authenticated.

In the previous implementations, the subscribing client obtains the public key of the oracle engine connected to the second blockchain, and uses the public key as the authentication data source. Further, when obtaining, by using the cross-chain interaction end, the data that is to be authenticated in the second blockchain and is published by the publishing client, where the data to be authenticated is signed by the oracle engine based on the private key held by the oracle engine, the subscribing client can perform, based on the authentication data source and the signature of the data to be authenticated, data authentication on the data to be authenticated.

Because the oracle engine connected to the second blockchain signs the data in the second blockchain based on the private key held by the oracle engine, the subscribing client only needs to store the public key of the oracle engine as the authentication data source to perform authentication on the data in the second blockchain based on the public key of the oracle engine and a signature carried in the data. As such, complexity that the subscribing client performs authentication on the data in the second blockchain can be reduced.

In addition, because data can be synchronized between the first blockchain and the second blockchain by using the cross-chain interaction end through subscription and publishing, non-invasive sidechain anchoring can be implemented between different blockchains while the blockchains are mutually isolated, to establish a low-complexity and high-scalability cross-chain network.

DESCRIPTION OF IMPLEMENTATIONS

Figure 1:
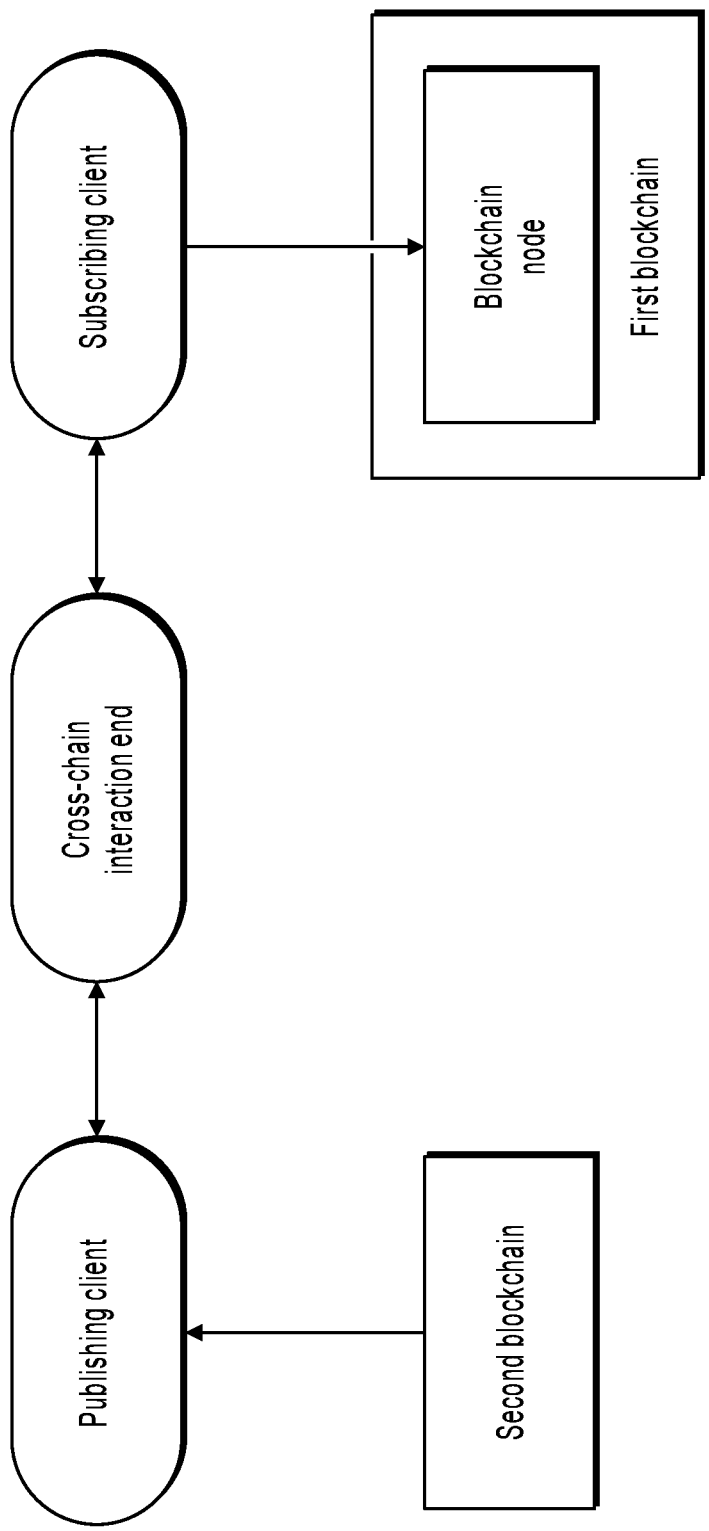
FIG. 1 is a schematic architectural diagram illustrating a system for cross-blockchain interaction, according to an example implementation.

Sidechain technology is a technology that uses a blockchain as a primary chain to further extend a side chain and implement sidechain anchoring between the side chain and the primary chain.

The side chain is a blockchain capable of performing authentication on data from the primary chain. For example, the side chain can verify whether a transaction, a block, or another form of blockchain data is included in each block in the primary chain. If a blockchain is capable of performing authentication on data in another blockchain, the blockchain is referred to as a side chain of the other blockchain. Correspondingly, the sidechain anchoring is a process of configuring an authentication root (which usually includes an authentication data source and authentication rules) in the side chain, so that the side chain is capable of performing authentication on the data from the primary chain.

The present specification intends to provide a sidechain anchoring framework based on a subscription and publishing model, so that non-invasive sidechain anchoring can be implemented between different blockchains while the blockchains are mutually isolated.

During implementation, a system for cross-chain interaction including a subscribing client, a publishing client, and a cross-chain interaction end can be established. The subscribing client corresponds to a first blockchain. The publishing client corresponds to a second blockchain. The cross-chain interaction end can be separately connected to the subscribing client and the publishing client. In addition, the second blockchain can be connected to an oracle engine that is used as a trusted node in the second blockchain.

The oracle engine is configured to perform data authentication on data in the second blockchain; and after the data authentication succeeds, sign, based on a private key held by the oracle engine, data that is successfully authenticated. The subscribing client can obtain a public key of the oracle engine, and use the public key as an authentication data source.

When the subscribing client obtains, by using the cross-chain interaction end, data that is to be authenticated in the second blockchain and is published by the publishing client, where the data to be authenticated is signed by the oracle engine based on the private key held by the oracle engine, the subscribing client can perform, based on the authentication data source and a signature of the data to be authenticated, data authentication on the data to be authenticated.

In the previously discussed technical solution, because the oracle engine connected to the second blockchain signs the data in the second blockchain based on the private key held by the oracle engine, the subscribing client only needs to store the public key of the oracle engine as the authentication data source to perform authentication on the data in the second blockchain based on the public key of the oracle engine and a signature carried in the data. As such, complexity that the subscribing client performs authentication on the data in the second blockchain can be reduced.

In addition, because data can be synchronized between the first blockchain and the second blockchain by using the cross-chain interaction end through subscription and publishing, non-invasive sidechain anchoring can be implemented between different blockchains while the blockchains are mutually isolated, to establish a low-complexity and high-scalability cross-chain network.

The following describes the present specification by using specific implementations with reference to specific application scenarios.

FIG. 1 is a schematic architectural diagram illustrating a system for cross-blockchain interaction, according to an example implementation.

As shown in FIG. 1, the system for cross-blockchain interaction can be a sidechain anchoring framework established based on a publishing and subscription model, and can include a first blockchain, a second blockchain, a subscribing client, a publishing client, and a cross-chain interaction end.

The first blockchain is an anchoring chain (which can be used as a side chain) corresponding to the subscribing client in the present specification. Correspondingly, the second blockchain is an anchored chain (which can be used as a primary chain) corresponding to the publishing client in the present specification.

It is worthwhile to note that in the present specification, the "first blockchain" and the "second blockchain" are only used to distinguish roles played by different blockchains. The first blockchain is a type of blockchain that can be used as a side chain, the second blockchain is a type of blockchain that can be used as a primary chain, and the "first blockchain" or the "second blockchain" does not particularly refer to a certain blockchain.

The subscribing client corresponds to the first blockchain, and is configured to maintain data from the second blockchain that the first blockchain subscribes to.

As shown in FIG. 1, in an implementation, the subscribing client can correspond to a node device in the first blockchain, and is configured to maintain a message queue corresponding to the blockchain node. The message queue includes data that the blockchain node subscribes to.

For example, the subscribing client can be a client component implemented based on the first blockchain by using a smart contract in the first blockchain, or a client component implemented based on a native expansion capability of a node device connected to the subscribing client.

In another implementation, the subscribing client can be configured on a device, a node, a platform, etc. that is independent of the first blockchain, and bridge with the first blockchain by using an implemented bridging interface.

The publishing client corresponds to the second blockchain, and is configured to obtain and publish data that have achieved a consensus in the second blockchain.

For example, during implementation, the publishing client can implement a bridging interface, provide a data query service oriented to the second blockchain, and bridge the second blockchain. Because of the distributed ledger technology of a blockchain, all blockchain nodes in the second blockchain can reach a consensus on maintaining full ledger data of same content, namely, a blockchain ledger, and the publishing client can obtain publishable messages from the blockchain ledger, so that the cross-chain interaction end can obtain the messages.

In an implementation, the publishing client can correspond to a node device in the second blockchain. In another implementation, the publishing client can be configured on a device, a node, a platform, etc. that is independent of the second blockchain. In another implementation, the publishing client can be configured on a blockchain node in the second blockchain.

The cross-chain interaction end is separately connected to the first blockchain and the second blockchain by using a bridging interface, and implements cross-chain data synchronization between the first blockchain and the second blockchain based on implemented data transfer logic. In an implementation, the cross-chain interaction end can receive a subscription request initiated by the subscribing client. The subscription request includes subscription conditions, and the subscription conditions are used to indicate a related subscription requirement to the cross-chain interaction end. The cross-chain interaction end can initiate a status query message to the subscribing client to query a data status maintained by the subscribing client, and determine, based on the data status returned by the subscribing client, whether data maintained by the subscribing client includes data satisfying the subscription conditions.

For example, during implementation, the subscribing client can correspond to a node device in the first blockchain, and maintain a message queue corresponding to the blockchain node to maintain data that the blockchain node subscribes to. In this case, the cross-chain interaction end can initiate a status query message to the subscribing client to query a queue status of the message queue, and determine, based on the queue status of the message queue that is returned by the subscribing client, whether the message queue includes a message satisfying the subscription conditions.

On the one hand, if the data maintained by the subscribing client includes the data satisfying the subscription conditions, the cross-chain interaction end does not need to repeatedly obtain the data. On the other hand, if the data maintained by the subscribing client does not include the data satisfying the subscription conditions, the cross-chain interaction end needs to obtain the data satisfying the subscription conditions from the publishing client. For example, the cross-chain interaction end can request the data satisfying the subscription conditions from the publishing client, and send, to the subscribing client, data returned by the publishing client, to update the data maintained by the subscribing client.

In the present specification, the cross-chain interaction end is only used to transfer data between the publishing client and the subscribing client, does not need to perform persistence storage on the transferred data, and does not need to maintain a data status of the transferred data. In an implementation, the cross-chain interaction end can be configured on a device, a node, a platform, etc. that is independent of the first blockchain and the second blockchain. In another implementation, the cross-chain interaction end can be configured on a node device in the first blockchain or the second blockchain.

Figure 2:
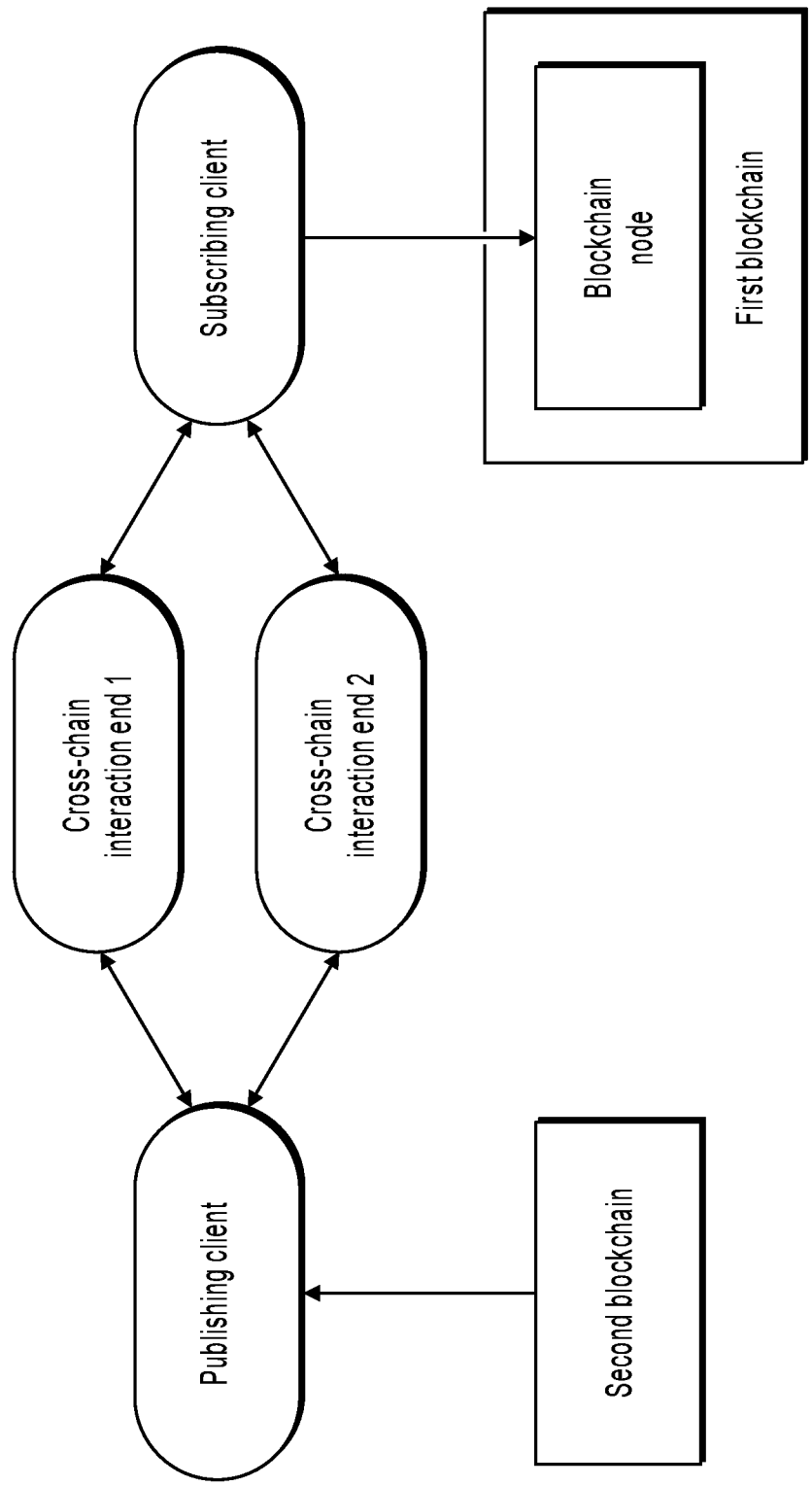
FIG. 2 is a schematic architectural diagram illustrating another system for cross-blockchain interaction, according to an example implementation.

Referring to FIG. 2, in actual applications, a plurality of mutually independent cross-chain interaction ends can be configured between the subscribing client and the publishing client, that is, the subscribing client and the publishing client can be separately connected to a plurality of independent cross-chain interaction ends, for example, cross-chain interaction end 1 and cross-chain interaction end 2 shown in FIG. 2.

As such, when the cross-chain interaction end encounters a denial of service attack, a service borne by the cross-chain interaction end that encounters a cross-chain attack can be quickly switched to another cross-chain interaction end. For example, as shown in FIG. 2, when cross-chain interaction end 1 encounters a denial of service attack, a service borne by cross-chain interaction end 1 can be immediately switched to cross-chain interaction end 2, so that the subscribing client can still use cross-chain interaction end 2 to obtain a message published by the publishing client.

Figure 3:
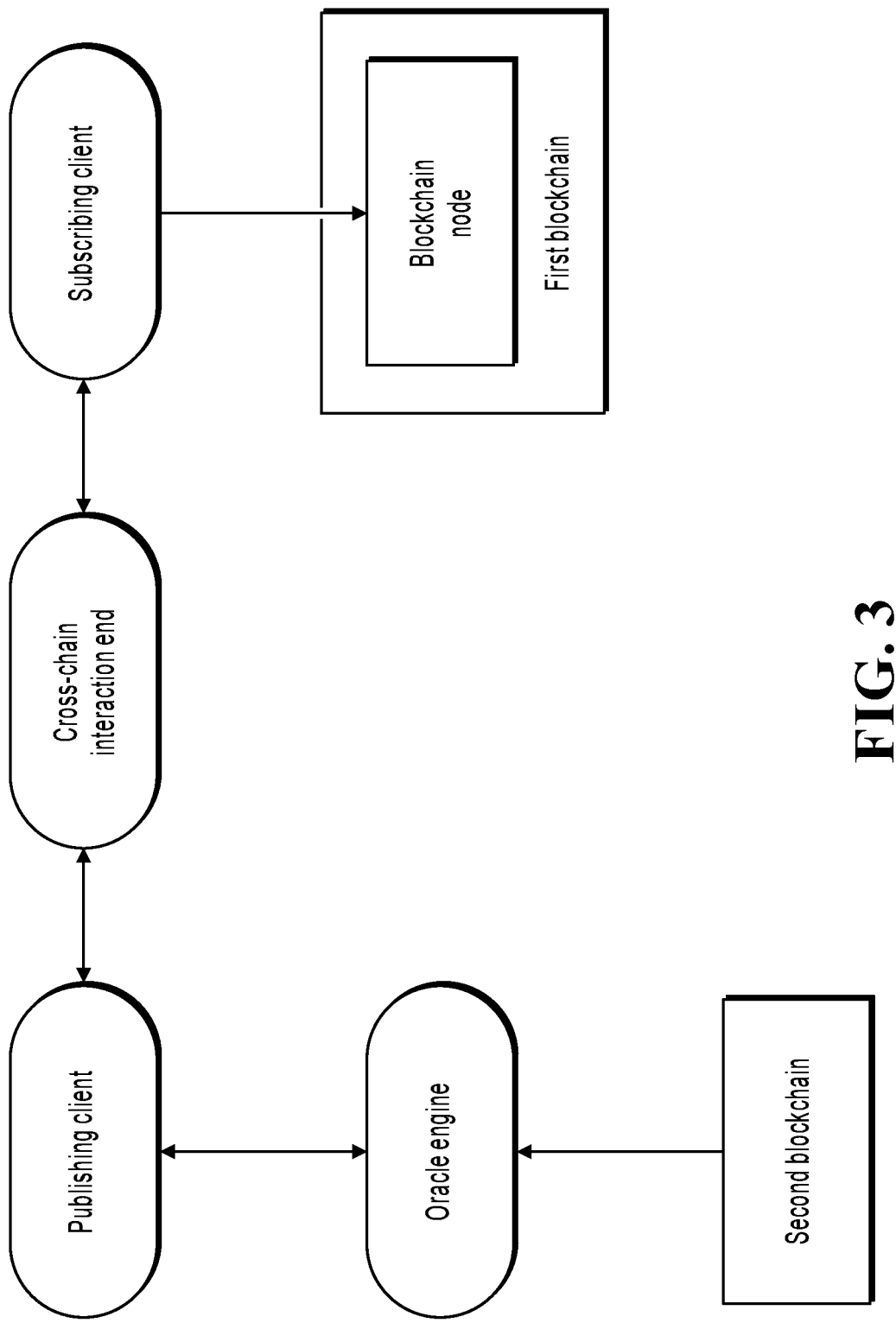
FIG. 3 is a schematic architectural diagram illustrating another system for cross-blockchain interaction, according to an example implementation.

Referring to FIG. 3, in an implementation, the second blockchain can be connected to an oracle engine that is used as a trusted node. The oracle engine can correspond to a node device in the second blockchain. For example, during implementation, one or more node devices in the second blockchain can be selected as the trusted node to act as the oracle engine.

The oracle engine is configured to perform data authentication on data in the second blockchain; after the data authentication succeeds, sign, based on a private key held by the oracle engine, data that is successfully authenticated, and actively push the signed data to the publishing client; or when receiving a data acquisition request from the publishing client, push the signed data to the publishing client in response to the data acquisition request.

The oracle engine can be connected to the subscribing client (that is, the oracle engine is between the second blockchain and the subscribing client). The subscribing client can obtain a public key of the oracle engine, and store the public key as an authentication data source, to be capable of performing authentication on the data in the second blockchain.

For example, in a case, the subscribing client can obtain the public key of the oracle engine that is configured by a user, and locally store the public key as the authentication data source. Alternatively, in another case, based on the previous system architecture, the public key of the oracle engine can be published online to the subscribing client by using the publishing client and the cross-chain interaction end. In this case, the subscribing client can obtain, by using the cross-chain interaction end, the public key of the oracle engine that is published by the publishing client, and use the public key as the authentication data source.

It is worthwhile to note that, in actual applications, functions of the publishing client and the oracle engine can be integrated. For example, in an implementation, the publishing client can act as the oracle engine connected to the second blockchain. In this case, the oracle engine that is independently deployed as a trusted node between the second blockchain and the publishing client is no longer required in the previous system architecture.

In the previous implementation, the cross-chain interaction end that separately bridges with the publishing client and the subscribing client is introduced in the system for cross-chain interaction that is established based on the publishing and subscription model, and data is synchronized between the first blockchain and the second blockchain in a method of information exchange based on publishing and subscription. Therefore, data isolation between the first blockchain and the second blockchain can be implemented, and data can be synchronized between the first blockchain and the second blockchain without directly performing data exchange. In addition, because the cross-chain interaction end is introduced between the publishing client and the subscribing client, the publishing client and the subscribing client can be decoupled in terms of service level, so that development difficulties of the publishing client and the subscribing client can be significantly reduced. For example, service logic related to the publishing client can be implemented without using the first blockchain, and service logic related to the subscribing client can be implemented without using the second blockchain, provided that the service logic related to the subscribing client and the service logic related to the publishing client are respectively implemented in the first blockchain and the second blockchain.

Figure 4:
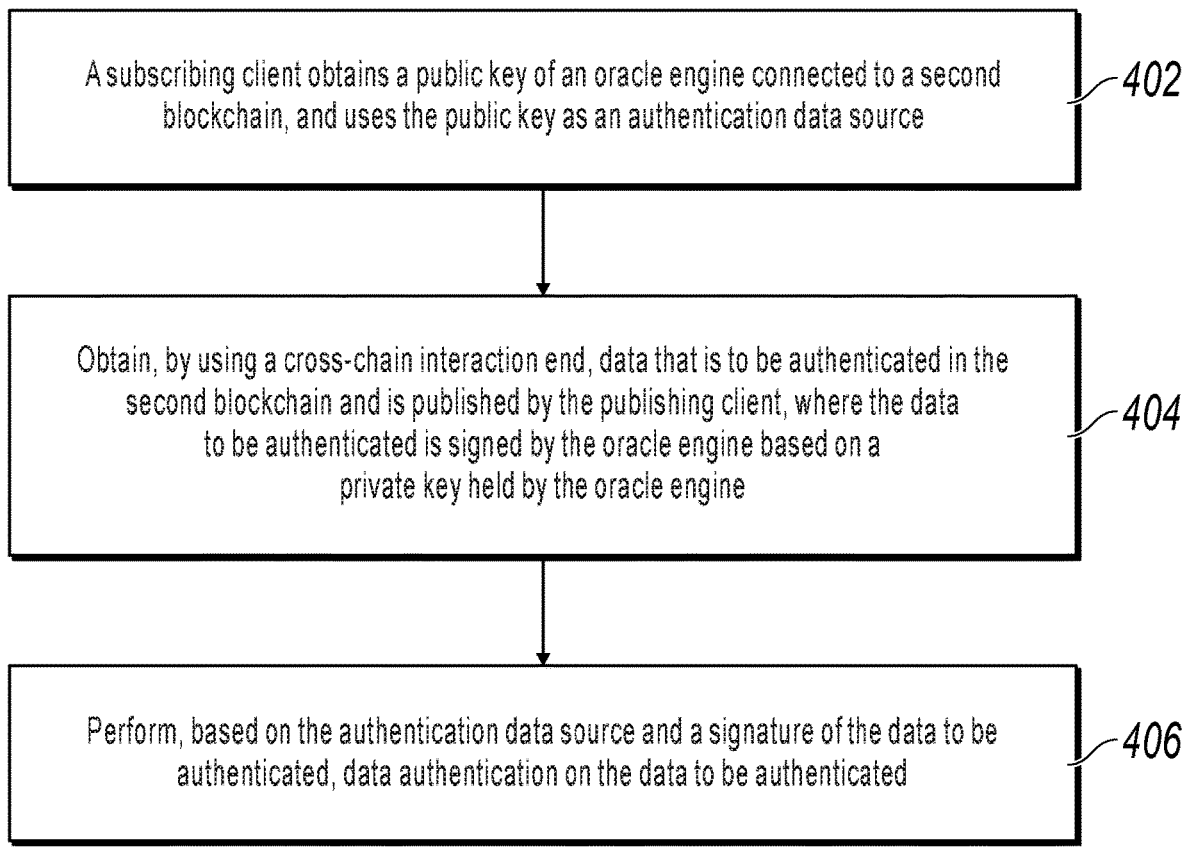
FIG. 4 is a flowchart illustrating a cross-blockchain authentication method, according to an example implementation.

FIG. 4 is a cross-blockchain authentication method, according to an implementation of the present specification. The method is applied to the subscribing client in the system for cross-chain interaction shown in FIG. 1, and includes the steps below.

Step 402. The subscribing client obtains a public key of an oracle engine connected to the second blockchain, and uses the public key as an authentication data source.

Step 404. Obtain, by using the cross-chain interaction end, data that is to be authenticated in the second blockchain and is published by the publishing client, where the data to be authenticated is signed by the oracle engine based on a private key held by the oracle engine.

Step 406. Perform, based on the authentication data source and a signature of the data to be authenticated, data authentication on the data to be authenticated.

A blockchain described in this implementation can include any type of blockchain network that can be used as a side chain to be anchored to another blockchain network.

For example, in a scenario, the blockchain can be any specific member blockchain in a consortium blockchain including several member blockchains. In the consortium blockchain, each member blockchain can be used as a side chain to be anchored to another member blockchain.

The data to be authenticated can include any form of data recorded in each block in the second blockchain. For example, the data to be authenticated can include but is not limited to a transaction (transfer), a block, a state, an event, etc.

In the present specification, an authentication root corresponding to the second blockchain can be configured in the subscribing client, so that the subscribing client is capable of performing authentication on data in the second blockchain, and the first blockchain is used as a side chain to be anchored to the second blockchain.

The authentication root configured in the subscribing client usually includes two parts: an authentication data source and authentication rules.

It is worthwhile to note that specific content included in the authentication data source usually depends on a data authentication protocol supported by the first blockchain and the second blockchain.

For example, the first blockchain and the second blockchain support the Simplified Payment Verification (SPV) protocol. In this case, the authentication data source configured in the subscribing client can include only block header data of all blocks that is stored in the second blockchain.

When both the first blockchain and the second blockchain support the oracle engine protocol, the authentication data source configured in the subscribing client can include a public key or public key set corresponding to the private key used when the oracle engine connected to the second blockchain signs the data in the second blockchain.

The authentication rules include authentication logic for performing authentication on the data in the second blockchain. It is worthwhile to note that, a type of the authentication logic included in the authentication rules usually depends on a specific type of data recorded in the second blockchain.

For example, in actual applications, the data in the second blockchain can include but is not limited to a transaction, a block, a state, an event, etc. Correspondingly, the authentication rules can include but is not limited to transaction authentication logic, block authentication logic, state authentication logic, event authentication logic, etc. In addition, specific content of the authentication logic included in the authentication rules usually depends on a data authentication protocol supported by the first blockchain and the second blockchain.

For example, the first blockchain and the second blockchain support the SPV protocol. In this case, the authentication logic included in the authentication rules configured in the subscribing client can be authentication logic for verifying whether data that is to be authenticated in the second blockchain and is received by the subscribing client is included in each block in the second blockchain. If it is determined that the data to be authenticated is included in the block in the second blockchain, authentication on the data that is to be authenticated succeeds.

When both the first blockchain and the second blockchain support the oracle engine protocol, the authentication logic included in the authentication rules configured in the subscribing client can be authentication logic for verifying, based on the configured public key or public key set corresponding to the private key used when the oracle engine connected to the second blockchain signs the data in the second blockchain, a signature carried in data that is to be authenticated in the second blockchain and is received by the subscribing client. If it is verified that the signature carried in the data to be authenticated is a valid signature of the trusted node, authentication on the data to be authenticated succeeds.

How the subscribing client performs authentication on the data in the second blockchain is described below by using an example that both the first blockchain and the second blockchain support the oracle engine protocol and the data to be authenticated is a transaction recorded in each block in the second blockchain.

In this implementation, when the first blockchain is used as a side chain to be anchored to the second blockchain used as a primary chain, an authentication root corresponding to the second blockchain can be configured in the subscribing client.

The subscribing client can obtain a public key or public key set of the oracle engine connected to the second blockchain, and locally store the public key or public key set as the authentication data source.

A method for obtaining the public key or public key set of the oracle engine can include the following two cases:

In a case, the subscribing client can obtain the public key of the oracle engine that is configured by a user, and locally store the public key as the authentication data source.

In another case, based on the previous system architecture, the public key of the oracle engine can be published online to the subscribing client by using the publishing client and the cross-chain interaction end. In this case, the subscribing client can obtain, by using the cross-chain interaction end, the public key of the oracle engine that is published by the publishing client, and use the public key as the authentication data source.

In addition, authentication rules used to perform authentication on a transaction in the second blockchain can be configured in the subscribing client. For the oracle engine protocol, the authentication rules can include authentication logic for verifying, based on the public key or public key set of the oracle engine, a signature carried in data that is to be authenticated in the second blockchain and is received by the subscribing client. After the authentication root corresponding to the second blockchain is configured in the subscribing client based on the previous method, the subscribing client is capable of performing authentication on the data to be authenticated in the second blockchain.

In the present specification, the oracle engine connected to the second blockchain can perform authentication on data in the second blockchain, and sign, based on the private key held by the oracle engine, data that is successfully authenticated after the authentication succeeds.

Authentication rules used when the oracle engine performs authentication on the data in the second blockchain are not limited in the present specification. When implementing the technical solutions of the present specification, a person of ordinary skill in the art can define and configure the authentication rules based on an actual requirement.

The subscribing client can perform cross-chain interaction with the publishing client by using the cross-chain interaction end, to obtain a transaction that is to be authenticated in the second blockchain and is published by the publishing client.

During implementation, the subscribing client can initiate a subscription request to the cross-chain interaction end, and the subscription request can carry subscription conditions that indicate a subscription requirement. The subscription requirement indicated by the subscription conditions carried in the subscription request can be obtaining the transaction recorded in each block in the second blockchain.

Certainly, in actual applications, the subscription requirement indicated by the subscription conditions can be obtaining block header data of all blocks in the second blockchain.

For example, when both the first blockchain and the second blockchain support the SPV protocol, for the SPV protocol, the authentication data source used when the subscribing client performs authentication on the data in the second blockchain is usually the block header data of all the blocks in the second blockchain, namely, a "simple blockchain" including block headers of all the blocks in the second blockchain. Therefore, in this case, the subscription requirement indicated by the subscription conditions can be obtaining the block header data of all the blocks in the second blockchain.

After obtaining the subscription request, the cross-chain interaction end can parse the subscription request, and obtain the subscription requirement indicated by the subscription conditions carried in the subscription request.

After obtaining the subscription requirement of the subscribing client, the cross-chain interaction end can initiate a status query message to the subscribing client to query a data status maintained by the subscribing client, and determine, based on the data status returned by the subscribing client, whether data maintained by the subscribing client includes data satisfying the subscription conditions.

For example, when the subscribing client maintains subscribed data by using a message queue, the cross-chain interaction end can initiate a status query message to the subscribing client to query a queue status of the message queue, and determine, based on the queue status of the message queue that is returned by the subscribing client, whether data maintained by the subscribing client includes data satisfying the subscription conditions.

On the one hand, if the data maintained by the subscribing client includes a transaction satisfying the subscription conditions, the cross-chain interaction end does not need to repeatedly obtain the transaction from the second blockchain.

On the other hand, if the data maintained by the subscribing client does not include a transaction satisfying the subscription conditions, the cross-chain interaction end needs to obtain the transaction satisfying the subscription conditions from the publishing client. For example, the cross-chain interaction end can send a data synchronization request to the publishing client; request, from the publishing client, a transaction that satisfies specified conditions and is recorded in each block in the second blockchain; and send, to the subscribing client, the transaction returned by the publishing client, to update the data maintained by the subscribing client.

Certainly, in actual applications, if the cross-chain interaction end determines, by using the previous status query process, that a transaction satisfying the condition is newly added in the second blockchain, the cross-chain interaction end can send the transaction that satisfies the condition and is newly added in the second blockchain to the subscribing client by using the previous data synchronization method, to update the data maintained by the subscribing client in a timely manner.

In the present implementation, after the subscribing client obtains the transaction that is to be authenticated in the second blockchain and is published by the publishing client, the subscribing client can perform, based on the public key or public key set in the configured authentication data source and a signature of the transaction to be authenticated, data authentication on the transaction to be authenticated.

A process of performing, based on the public key or public key set in the authentication data source and the signature of the transaction to be authenticated, data authentication on the transaction to be authenticated is a process of decrypting, based on the public key in the authentication data source, the signature of the transaction to be authenticated.

During implementation, the subscribing client can obtain the public key of the oracle engine from the configured authentication data source, and then decrypt, based on the public key of the oracle engine, the signature of the transaction to be authenticated. If the signature of the transaction to be authenticated is successfully decrypted based on the obtained public key, it indicates that the transaction to be authenticated is a trusted transaction authorized by the oracle engine, and the authentication on the transaction to be authenticated succeeds. On the contrary, if the signature of the transaction to be authenticated fails to be decrypted based on the obtained public key, it indicates that the transaction to be authenticated is not a trusted transaction authorized by the oracle engine, and the authentication on the transaction to be authenticated fails.

It can be seen that, in the method, the oracle engine connected to the second blockchain performs authentication on a transaction in the second blockchain in advance, and signs, based on the private key held by the oracle engine, a transaction that is successfully authenticated. For the subscribing client, a process of performing cross-chain authentication on the transaction in the second blockchain can be simplified to a process of verifying a signature of the transaction in the second blockchain. As such, cross-chain authentication performed by the subscribing client on the transaction in the second blockchain can be simplified, and complexity of cross-chain authentication can be reduced.

For ease of understanding, a cross-blockchain associated transfer is used as an example for description.

Figure 5:
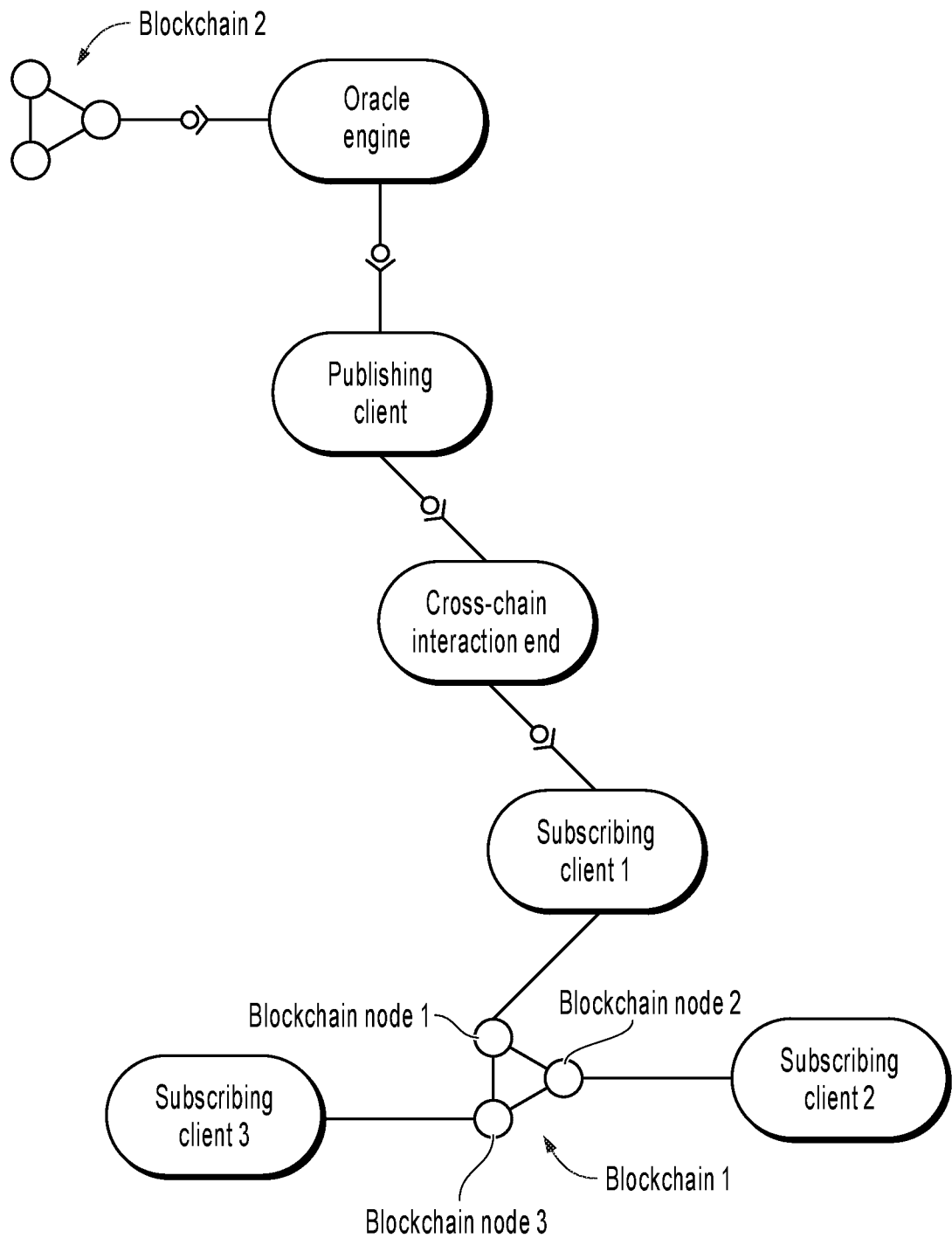
FIG. 5 is a schematic structural diagram illustrating a cross-blockchain associated transfer system, according to an example implementation.

FIG. 5 is a schematic structural diagram illustrating a cross-blockchain associated transfer system, according to an example implementation. As shown in FIG. 5, assume that user A has account A1 in blockchain 1 and account A2 in blockchain 2, and user B has account B1 in blockchain 1 and account B2 in blockchain 2. Account A1 and account B1 in blockchain 1 are used to maintain a certain type of asset object (such as RMB). Account A2 and account B2 in blockchain 2 are used to maintain another type of asset object (such as securities). When user A expects to sell securities to user B, it can be implemented by using the following associated transfer logic: User A transfers a specified quantity of securities from account A2 to account B2, and then user B transfers a specified amount of RMB from account B1 to account A1.

To improve reliability in a transfer process, a corresponding smart contract can be set in each of blockchain 1 and blockchain 2. As such, the previous two transfer processes are automatically completed, and an intentional or negligent false transfer amount, or a delay in a manual transfer process of a user is prevented, to ensure that the transfer process is quick and accurate.

In the technical solutions of the present specification, based on the previous process, blockchain 1 can be used as a side chain to be anchored to blockchain 2 used as a primary chain. In this case, an oracle engine connected to blockchain 2 can sign, based on a private key held by the oracle engine, a transaction that is of transferring a specified quantity of securities from account A2 to account B2 and has been completed in blockchain 2. The user can use, as an input, the transaction that is of transferring a specified quantity of securities from account A2 to account B2 and has been completed in blockchain 2, to submit the input to the previous smart contract for execution. The subscribing client (such as an SPV wallet) can verify a signature of the transaction based on a configured authentication data source (namely, a public key or public key set of the oracle engine) corresponding to blockchain 2. If the verification on the signature succeeds, it indicates that the transaction is a trusted transaction authorized by the oracle engine, and authentication on the transaction succeeds. If the authentication on the transaction succeeds, the previous smart contract can be invoked to trigger execution of a transaction of transferring a specified amount RMB from account B1 to account A1 in blockchain 1.

It can be seen from the previous implementations that, the subscribing client obtains the public key of the oracle engine connected to the second blockchain, and uses the public key as the authentication data source. Further, when obtaining, by using the cross-chain interaction end, the data that is to be authenticated in the second blockchain and is published by the publishing client, where the data to be authenticated is signed by the oracle engine based on the private key held by the oracle engine, the subscribing client can perform, based on the authentication data source and the signature of the data to be authenticated, data authentication on the data to be authenticated.

Because the oracle engine connected to the second blockchain signs data in the second blockchain based on the private key held by the oracle engine, the subscribing client only needs to store the public key of the oracle engine as the authentication data source to perform authentication on the data in the second blockchain based on the public key of the oracle engine and a signature carried in the data. As such, complexity that the subscribing client performs authentication on the data in the second blockchain can be reduced.

In addition, because data can be synchronized between the first blockchain and the second blockchain by using the cross-chain interaction end through subscription and publishing, non-invasive sidechain anchoring can be implemented between different blockchains while the blockchains are mutually isolated, to establish a low-complexity and high-scalability cross-chain network.

Figure 6:
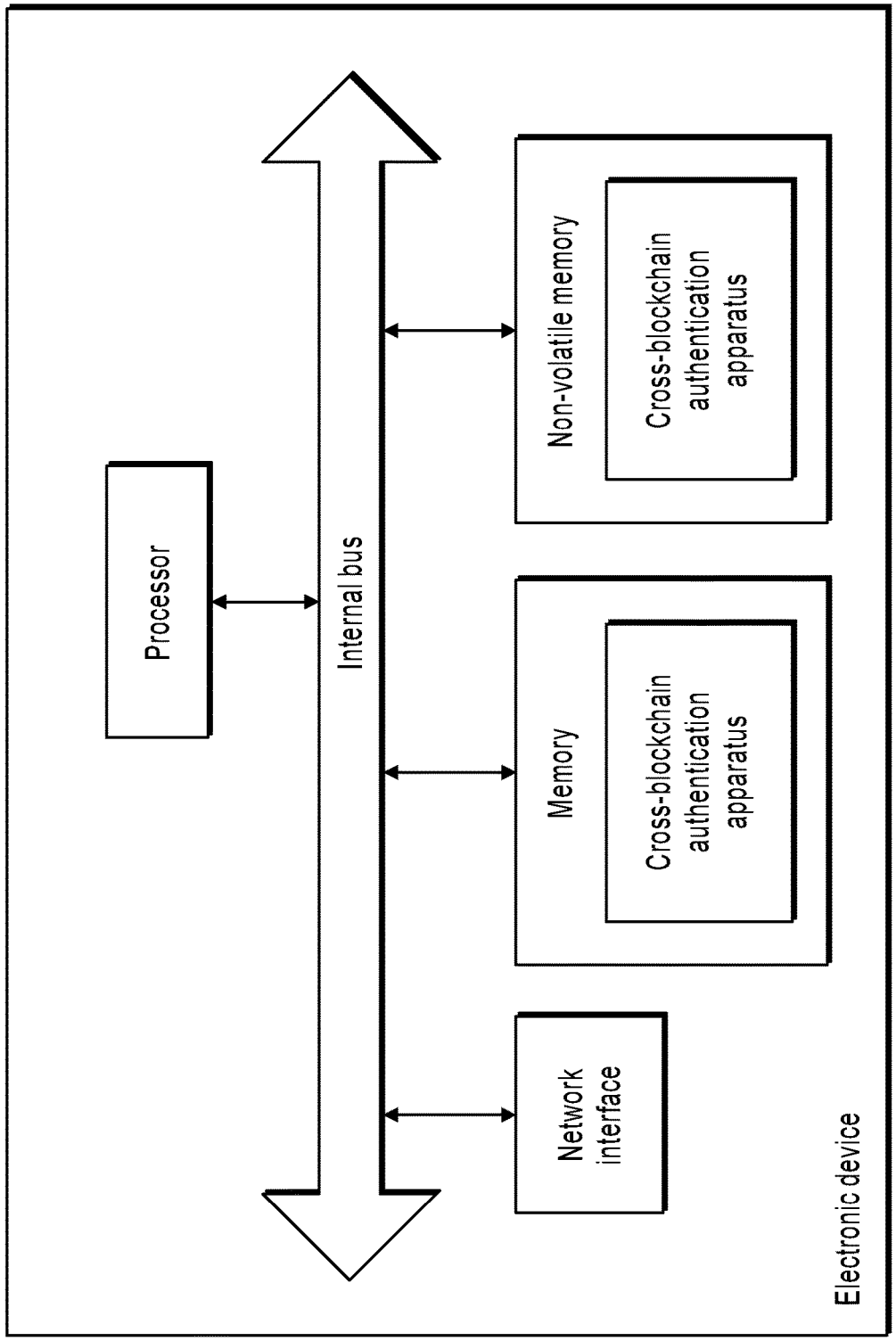
FIG. 6 is a schematic structural diagram illustrating an electronic device, according to an example implementation.

Corresponding to the previous method implementation, the present specification further provides an implementation of a cross-blockchain authentication apparatus. The implementation of the cross-blockchain authentication apparatus in the present specification can be applied to an electronic device. The apparatus implementation can be implemented by software, hardware, or a combination of hardware and software. Software implementation is used as an example. As a logical apparatus, the apparatus is formed by reading a corresponding computer program instruction in a non-volatile memory to a memory by a processor in the electronic device where the apparatus is located. In terms of hardware, FIG. 6 is a diagram illustrating a hardware structure of an electronic device where a cross-blockchain authentication apparatus is located in the present specification. In addition to a processor, a memory, a network interface, and a non-volatile memory shown in FIG. 6, the electronic device where the apparatus is located in the implementation can usually include other hardware based on actual functions of the electronic device. Details are omitted here for simplicity.

Figure 7:
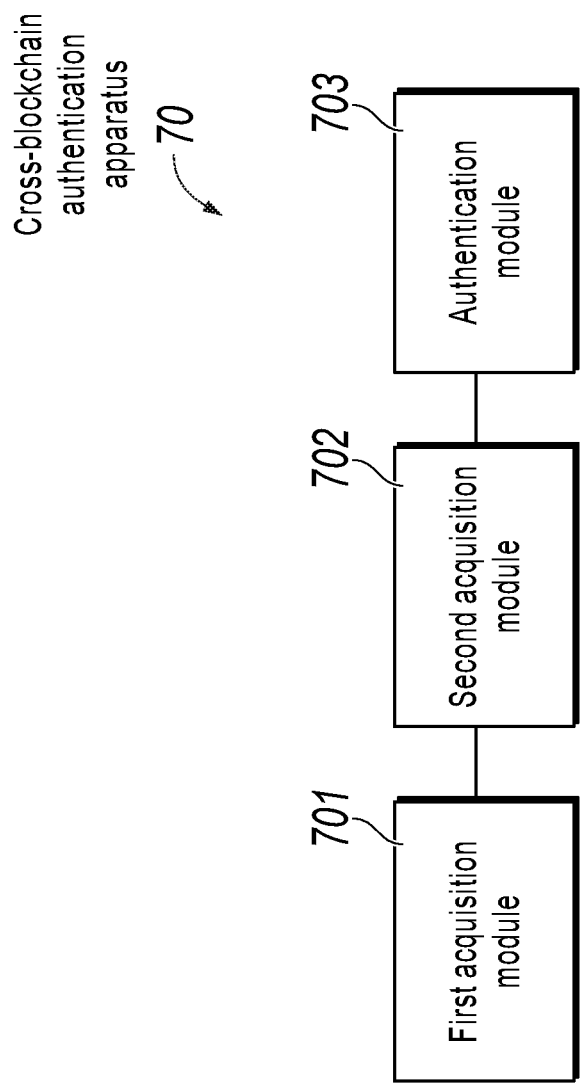
FIG. 7 is a block diagram illustrating a cross-blockchain authentication apparatus, according to an example implementation.

FIG. 7 is a block diagram illustrating a cross-blockchain authentication apparatus, according to an example implementation of the present specification.

Referring to FIG. 7, the cross-blockchain authentication apparatus 70 can be applied to the electronic device shown in FIG. 6. The electronic device is in a system for cross-chain interaction that includes a subscribing client, a publishing client, and a cross-chain interaction end. The subscribing client corresponds to a first blockchain. The publishing client corresponds to a second blockchain. The cross-chain interaction end is separately connected to the subscribing client and the publishing client. The apparatus 70 includes a first acquisition module 701, a second acquisition module 702, and an authentication module 703.

The first acquisition module 701 is configured to obtain a public key of an oracle engine connected to the second blockchain, and use the public key as an authentication data source.

The second acquisition module 702 is configured to obtain, by using the cross-chain interaction end, data that is to be authenticated in the second blockchain and is published by the publishing client, where the data to be authenticated is signed by the oracle engine based on a private key held by the oracle engine.

The authentication module 703 is configured to perform, based on the authentication data source and a signature of the data to be authenticated, data authentication on the data to be authenticated.

In this implementation, the first acquisition module 701 is configured to obtain the public key that is configured by a user and is of the oracle engine corresponding to the second blockchain, and use the public key as the authentication data source; or obtain, by using the cross-chain interaction end, the public key that is published by the publishing client and is of the oracle engine corresponding to the second blockchain, and use the public key as the authentication data source.

In this implementation, the second acquisition module 702 is configured to initiate a subscription request to the cross-chain interaction end, where the subscription request is used to indicate subscription conditions to the cross-chain interaction end, so that the cross-chain interaction end requests, from the publishing client based on the subscription conditions, data that is to be authenticated in the second blockchain and satisfies the subscription conditions; and obtain data that is to be authenticated and is published by the publishing client, where the data to be authenticated satisfies the subscription conditions, and is signed by the oracle engine based on the private key held by the oracle engine.

In this implementation, the authentication module 703 is configured to verify, based on the stored public key of the oracle engine in the authentication data source, the signature of the data to be authenticated; and if the verification on the signature succeeds, determine that the data authentication on the data to be authenticated succeeds.

In this implementation, the publishing client is connected to the oracle engine, and the oracle engine is configured to perform data authentication on data in the second blockchain; after the data authentication succeeds, sign, based on the private key held by the oracle engine, data that is successfully authenticated; and actively push the signed data to the publishing client; or push the signed data to the publishing client in response to a data acquisition request of the publishing client.

In this implementation, the oracle engine corresponding to the second blockchain is the publishing client.

In this implementation, the subscribing client corresponds to a node device in the first blockchain, and the publishing client and the oracle engine correspond to a node device in the second blockchain.

For an implementation process of functions of each module in the apparatus, references can be made to an implementation process of a corresponding step in the previous method. Details are omitted here for simplicity.

Because an apparatus implementation basically corresponds to a method implementation, for related parts, references can be made to related descriptions in the method implementation. The previous apparatus implementation is only an example. The modules described as separate parts may or may not be physically separate, and parts displayed as modules may or may not be physical modules, may be located in one position, or may be distributed on a plurality of network modules. Some or all of the modules can be selected based on actual needs to achieve the objectives of the solutions in the present specification. A person of ordinary skill in the art can understand and implement the implementations of the present specification without creative efforts.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email device, a game console, a tablet computer, a wearable device, or any combination of these devices.

Corresponding to the previous method implementation, the present specification further provides an implementation of an electronic device. The electronic device is in a system for cross-chain interaction that includes a subscribing client, a publishing client, and a cross-chain interaction end. The subscribing client corresponds to a first blockchain. The publishing client corresponds to a second blockchain. The cross-chain interaction end is separately connected to the subscribing client and the publishing client. The electronic device includes a processor and a memory configured to store a machine executable instruction. The processor and the memory are usually connected to each other by using an internal bus. In another possible implementation, the device can further include an external interface, to communicate with another device or component.

In this implementation, after the machine executable instruction that is stored in the memory and corresponds to control logic of cross-blockchain authentication is read and executed, the processor is configured to obtain a public key of an oracle engine connected to the second blockchain, and use the public key as an authentication data source; obtain, by using the cross-chain interaction end, data that is to be authenticated in the second blockchain and is published by the publishing client, where the data to be authenticated is signed by the oracle engine based on a private key held by the oracle engine; and perform, based on the authentication data source and a signature of the data to be authenticated, data authentication on the data to be authenticated.

In this implementation, after the machine executable instruction that is stored in the memory and corresponds to control logic of cross-blockchain authentication is read and executed, the processor is configured to obtain the public key that is configured by a user and is of the oracle engine corresponding to the second blockchain, and use the public key as the authentication data source; or obtain, by using the cross-chain interaction end, the public key that is published by the publishing client and is of the oracle engine corresponding to the second blockchain, and use the public key as the authentication data source.

In this implementation, after the machine executable instruction that is stored in the memory and corresponds to control logic of cross-blockchain authentication is read and executed, the processor is configured to initiate a subscription request to the cross-chain interaction end, where the subscription request is used to indicate subscription conditions to the cross-chain interaction end, so that the cross-chain interaction end requests, from the publishing client based on the subscription conditions, data that is to be authenticated in the second blockchain and satisfies the subscription conditions; and obtain data that is to be authenticated and is published by the publishing client, where the data to be authenticated satisfies the subscription conditions, and is signed by the oracle engine based on the private key held by the oracle engine.

In this implementation, after the machine executable instruction that is stored in the memory and corresponds to control logic of cross-blockchain authentication is read and executed, the processor is configured to verify, based on the stored public key of the oracle engine in the authentication data source, the signature of the data to be authenticated; and if the verification on the signature succeeds, determine that the data authentication on the data to be authenticated succeeds.

A person of ordinary skill in the art can easily figure out another implementation of the present specification after considering the present specification and practicing the disclosed invention here. The present specification is intended to cover any variations, uses, or adaptations of the present specification, and these variations, uses, or adaptations follow the general principles of the present specification and include common knowledge or a commonly used technical means that is not disclosed in the technical field of the present specification. The specification and the implementations are only considered as examples, and the actual scope and the spirit of the present specification are pointed out by the following claims.

It should be understood that the present specification is not limited to the structures that have been previously described and shown in the drawings, and various modifications and changes can be made without departing from the scope of the present specification.

The previous descriptions are only preferred implementations of the present specification, but are not intended to limit the present specification. Any modification, equivalent replacement, or improvement made without departing from the spirit and principle of the present specification shall fall within the protection scope of the present specification.

Figure 8:
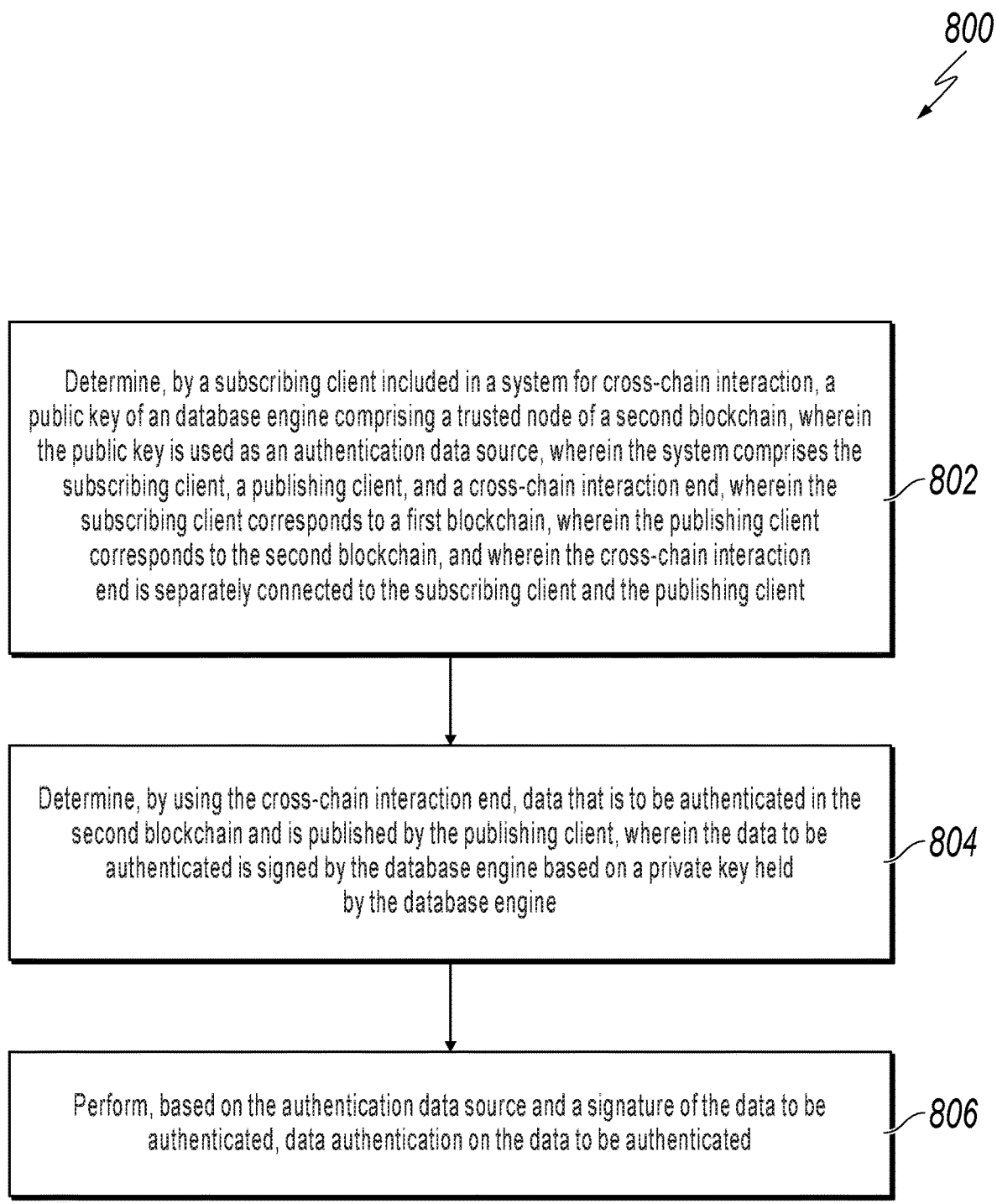
FIG. 8 is a flowchart illustrating an example of a computer-implemented method for cross-blockchain authentication, according to an implementation of the present disclosure.

FIG. 8 is a flowchart illustrating an example of a computer-implemented method 800 for cross-blockchain authentication, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, a public key of a database engine that includes a trusted node of a second blockchain is determined by a subscribing client included in a system for cross-chain interaction. The public key is used as an authentication data source. The system includes the subscribing client, a publishing client, and a cross-chain interaction end. The subscribing client corresponds to a first blockchain. The publishing client corresponds to the second blockchain. The cross-chain interaction end is separately connected to the subscribing client and the publishing client. As an example, referring to FIG. 1, the subscribing client of FIG. 1 can determine a public key of an ORACLE engine that includes a trusted node of the second blockchain of FIG. 1. Determining the public key can be part of the cross-chain interaction (shown in FIG. 1) between the subscribing client of FIG. 1, the publishing client of FIG. 1, and the cross-chain interaction end of FIG. 1. The public key can serve as a configured authentication data source, for example.

In some implementations, determining the public key can include determining that the public key is configured by a user and is of the database engine. For example, users can configure public keys to be used as configured authentication data sources, and the public keys can be stored in a database engine, such as in an ORACLE engine.

In some implementations, determining the public key can include determining, by using the cross-chain interaction end, that the public key is published by the publishing client and is from the database engine. For example, as part of the cross-chain interaction of FIG. 1, the publishing client of FIG. 1 can publish the public key to the cross-chain interaction end of FIG. 1, such as to make the public key available to the cross-chain interaction end of FIG. 1.

In some implementations, the publishing client can be connected to the database engine, and the database engine can be configured to perform operations including the following. Data authentication can be performed on data in the second blockchain (for example, the second blockchain of FIG. 1). A determination can be made whether the data authentication succeeds. In response to determining that the data authentication succeeds, the data that is successfully authenticated can be signed based on the private key held by the database engine. The data can be actively pushed to the publishing client (for example, the publishing client of FIG. 1), or the data can be pushed to the publishing client in response to a data acquisition request of the publishing client. From 802, method 800 proceeds to 804.

At 804, data that is to be authenticated in the second blockchain is determined by using the cross-chain interaction end, and the data is published by the publishing client. The data to be authenticated is signed by the database engine based on a private key held by the database engine. As an example, the cross-chain interaction end of FIG. 1 can determine the data that is to be authenticated in the second blockchain of FIG. 1, and the publishing client of FIG. 1 can publish the data. The ORACLE engine, for example, can sign the data to be authenticated.

In some implementations, determining the data that is to be authenticated can include the use of subscription requests. For example, a subscription request can be initiated to the cross-chain interaction end of FIG. 1. The subscription request can be used to indicate subscription conditions to the cross-chain interaction end of FIG. 1. Based on the subscription conditions, the cross-chain interaction end of FIG. 1 can request, from the publishing client, data that is to be authenticated in the second blockchain of FIG. 1 and that satisfies the subscription conditions. Data that is to be authenticated can be determined and published by the publishing client of FIG. 1. The data to be authenticated can satisfy the subscription conditions and can be signed by the database engine based on the private key held by the database engine. From 804, method 800 proceeds to 806.

At 806, data authentication is performed on the data to be authenticated. The data authentication is based on the authentication data source and a signature of the data to be authenticated. As an example, the system for cross-blockchain interaction described with reference to FIG. 1 can authenticate the data using an authentication source (for example, the public key) and the signature established for use in authentication. In some implementations, performing data authentication on the transaction to be authenticated can include decrypting the signature of the transaction to be authenticated based on the public key in the authentication data source.

In some implementations, performing the data authentication can include verification of a signature of the data to be authenticated. For example, the signature of the data to be authenticated can be verified based on the public key of the database engine in the authentication data source. If the signature of the data is verified, a determination can be made that the data authentication on the data to be authenticated is successful.

In some implementations, performing the data authentication can include using authentication rules that include authentication logic that depends on a specific type of the data recorded on the second blockchain. The type of the authentication logic included in the authentication rules can depend, for example, on a specific type of data recorded in the second blockchain of FIG. 1. For example, the authentication rules can include one or more of transaction authentication logic, block authentication logic, state authentication logic, and event authentication logic. After 806, method 800 can stop.

The present disclosure relates to cross-blockchain authentication. In particular, a method for cross-blockchain authentication can include the following. A public key of a database (for example, ORACLE) engine connected to a second blockchain is obtained by a subscribing client. The public key is used as an authentication data source. Data that is to be authenticated in the second blockchain is obtained by using the cross-chain interaction end and is published by the publishing client. The data to be authenticated is signed by the database engine based on a private key held by the database engine. Data authentication is performed on the data to be authenticated. The data authentication is based on the authentication data source and a signature of the data to be authenticated. An advantage of this techniques is that by using the cross-chain interaction end through subscription and publishing, non-invasive sidechain anchoring can be implemented between different blockchains while the blockchains are mutually isolated, to establish a low-complexity and high-scalability cross-chain network.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for cross-blockchain authentication, comprising:
 determining, by a subscribing client included in a system for cross-chain interaction and from a plurality of public keys configured as authentication data sources, a first public key of an oracle engine comprising a trusted node of a second blockchain, wherein the first public key authenticates data in the second blockchain, wherein the system comprises the subscribing client, a publishing client, and a cross-chain interaction end, wherein the subscribing client corresponds to a first blockchain, wherein the publishing client corresponds to the second blockchain, and wherein the cross-chain interaction end is separately connected to the subscribing client and the publishing client;

determining, by the subscribing client using the connection of the cross-chain interaction end to the second blockchain, data from the second blockchain that is to be authenticated and is published by the publishing client, wherein the data to be authenticated comprises a signature that is generated by the oracle engine based on a private key held by the oracle engine, wherein the oracle engine is configured to perform operations comprising performing data authentication on the data from the second blockchain, determining that the data authentication succeeds, in response to determining that the data authentication succeeds, signing, based on the private key held by the oracle engine, the data from the second blockchain to provide signed data, and pushing the signed data to the publishing client; and performing, by the subscribing client, based on the first public key of the oracle engine and the signature of the data to be authenticated, authentication on the signed data.

2. The computer-implemented method of claim 1, wherein determining the first public key comprises:
determining that the first public key is configured by a user and is of the oracle engine.

3. The computer-implemented method of claim 1, wherein determining the first public key comprises:
determining, based upon the cross-chain interaction end, that the first public key that is published by the publishing client and is of the oracle engine.

4. The computer-implemented method of claim 1, wherein determining the data that is to be authenticated comprises:
initiating a subscription request to the cross-chain interaction end, wherein the subscription request is used to indicate subscription conditions to the cross-chain interaction end, so that the cross-chain interaction end requests, from the publishing client based on the subscription conditions, data that is to be authenticated in the second blockchain and satisfies the subscription conditions; and determining data that is to be authenticated and is published by the publishing client, wherein the data to be authenticated satisfies the subscription conditions and is signed by the oracle engine based on the private key held by the oracle engine.

5. The computer-implemented method of claim 1, wherein performing the data authentication comprises:
verifying, based on the first public key of the oracle engine, the signature of the data to be authenticated; and in response to the signature of the data being verified, determining that the data authentication on the data to be authenticated succeeds.

6. The computer-implemented method of claim 1, wherein performing the data authentication includes using authentication rules comprising authentication logic that depends on a specific type of the data recorded on the second blockchain.

7. A non-transitory, computer-readable medium storing one or more instructions executable by a computer system to perform operations comprising:
determining, by a subscribing client included in a system for cross-chain interaction and from a plurality of public keys configured as authentication data sources, a first public key of an oracle engine comprising a trusted node of a second blockchain, wherein the first public key authenticates data in the second blockchain, wherein the system comprises the subscribing client, a publishing client, and a cross-chain interaction end, wherein the subscribing client corresponds to a first blockchain, wherein the publishing client corresponds to the second blockchain, and wherein the cross-chain interaction end is separately connected to the subscribing client and the publishing client;

determining, by the subscribing client using the connection of the cross-chain interaction end to the second blockchain, data from the second blockchain that is to be authenticated and is published by the publishing client, wherein the data to be authenticated comprises a signature that is generated by the oracle engine based on a private key held by the oracle engine, wherein the oracle engine is configured to perform operations comprising performing data authentication on the data from the second blockchain, determining that the data authentication succeeds, in response to determining that the data authentication succeeds, signing, based on the private key held by the oracle engine, the data from the second blockchain to provide signed data, and pushing the signed data to the publishing client; and performing, by the subscribing client, based on the first public key of the oracle engine and the signature of the data to be authenticated, authentication on the signed data.

8. The non-transitory, computer-readable medium of claim 7, wherein determining the first public key comprises:
determining that the first public key is configured by a user and is of the oracle engine.

9. The non-transitory, computer-readable medium of claim 7, wherein determining the first public key comprises:
determining, based upon the cross-chain interaction end, that the first public key that is published by the publishing client and is of the oracle engine.

10. The non-transitory, computer-readable medium of claim 7, wherein determining the data that is to be authenticated comprises:
initiating a subscription request to the cross-chain interaction end, wherein the subscription request is used to indicate subscription conditions to the cross-chain interaction end, so that the cross-chain interaction end requests, from the publishing client based on the subscription conditions, data that is to be authenticated in the second blockchain and satisfies the subscription conditions; and determining data that is to be authenticated and is published by the publishing client, wherein the data to be authenticated satisfies the subscription conditions and is signed by the oracle engine based on the private key held by the oracle engine.

11. The non-transitory, computer-readable medium of claim 7, wherein performing the data authentication comprises:
verifying, based on the first public key of the oracle engine, the signature of the data to be authenticated; and in response to the signature of the data being verified, determining that the data authentication on the data to be authenticated succeeds.

12. The non-transitory, computer-readable medium of claim 7, wherein performing the data authentication includes using authentication rules comprising authentication logic that depends on a specific type of the data recorded on the second blockchain.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
determining, by a subscribing client included in a system for cross-chain interaction and from a plurality of public keys configured as authentication data sources, a first public key of an oracle engine comprising a trusted node of a second blockchain, wherein the first public key authenticates data in the second blockchain, wherein the system comprises the subscribing client, a publishing client, and a cross-chain interaction end, wherein the subscribing client corresponds to a first blockchain, wherein the publishing client corresponds to the second blockchain, and wherein the cross-chain interaction end is separately connected to the subscribing client and the publishing client;
determining, by the subscribing client using the connection of the cross-chain interaction end to the second blockchain, data from the second blockchain that is to be authenticated and is published by the publishing client, wherein the data to be authenticated comprises a signature that is generated by the oracle engine based on a private key held by the oracle engine, wherein the oracle engine is configured to perform operations comprising
performing data authentication on the data from the second blockchain,
determining that the data authentication succeeds,
in response to determining that the data authentication succeeds, signing, based on the private key held by the oracle engine, the data from the second blockchain to provide signed data, and
pushing the signed data to the publishing client; and
performing, by the subscribing client, based on the first public key of the oracle engine and the signature of the data to be authenticated, authentication on the signed data.

14. The computer-implemented system of claim 13, wherein determining the first public key comprises:
determining that the first public key is configured by a user and is of the oracle engine.

15. The computer-implemented system of claim 13, wherein determining the first public key comprises:
determining, based upon the cross-chain interaction end, that the first public key that is published by the publishing client and is of the oracle engine.

16. The computer-implemented system of claim 13, wherein determining the data that is to be authenticated comprises:
initiating a subscription request to the cross-chain interaction end, wherein the subscription request is used to indicate subscription conditions to the cross-chain interaction end, so that the cross-chain interaction end requests, from the publishing client based on the subscription conditions, data that is to be authenticated in the second blockchain and satisfies the subscription conditions; and
determining data that is to be authenticated and is published by the publishing client, wherein the data to be authenticated satisfies the subscription conditions and is signed by the oracle engine based on the private key held by the oracle engine.

17. The computer-implemented system of claim 13, wherein performing the data authentication comprises:
verifying, based on the first public key of the oracle engine, the signature of the data to be authenticated; and
in response to the signature of the data being verified, determining that the data authentication on the data to be authenticated succeeds.

* * * * *